United States Patent [19]

Young

[11] 4,091,613
[45] May 30, 1978

[54] INDEPENDENT POWER GENERATOR

[75] Inventor: Richard N. Young, Yorktown, Va.

[73] Assignee: The United States of America as represented by the Administrator of the National Aeronautics and Space Administration, Washington, D.C.

[21] Appl. No.: 710,036

[22] Filed: July 30, 1976

[51] Int. Cl.² .......................... F02C 7/00; F02C 7/26
[52] U.S. Cl. .................................. 60/39.07; 60/39.14; 60/39.33; 98/1.5; 417/88
[58] Field of Search .......... 290/52; 60/39.07, 39.18 C, 60/39.33, 39.14; 98/1.5; 62/DIG. 5; 244/118 P; 417/159, 88

[56] References Cited
U.S. PATENT DOCUMENTS

| 2,491,462 | 12/1949 | Wood | 98/1.5 |
| 2,678,542 | 5/1954 | Stanton | 60/39.07 |
| 2,734,443 | 2/1956 | Wood | 98/1.5 |
| 2,777,301 | 1/1957 | Kuhn | 98/1.5 |
| 3,082,609 | 3/1963 | Ryan et al. | 62/DIG. 5 |
| 3,965,673 | 6/1976 | Friedrich | 60/39.14 |

Primary Examiner—Louis J. Casaregola
Attorney, Agent, or Firm—Howard J. Osborn; John R. Manning

[57] ABSTRACT

A gas turbine powered aircraft auxiliary power system capable of efficiently supplying all aircraft auxiliary services both in flight and on the ground and further capable of operating independently of the aircraft main engines. The system employs multiple gas turbine compressor stages, and utilizes the aircraft cabin as a plenum chamber between the first and second compressor stages, thereby accomplishing cabin pressurization, ventilation and heating.

14 Claims, 1 Drawing Figure

U.S.Patent    May 30, 1978    4,091,613
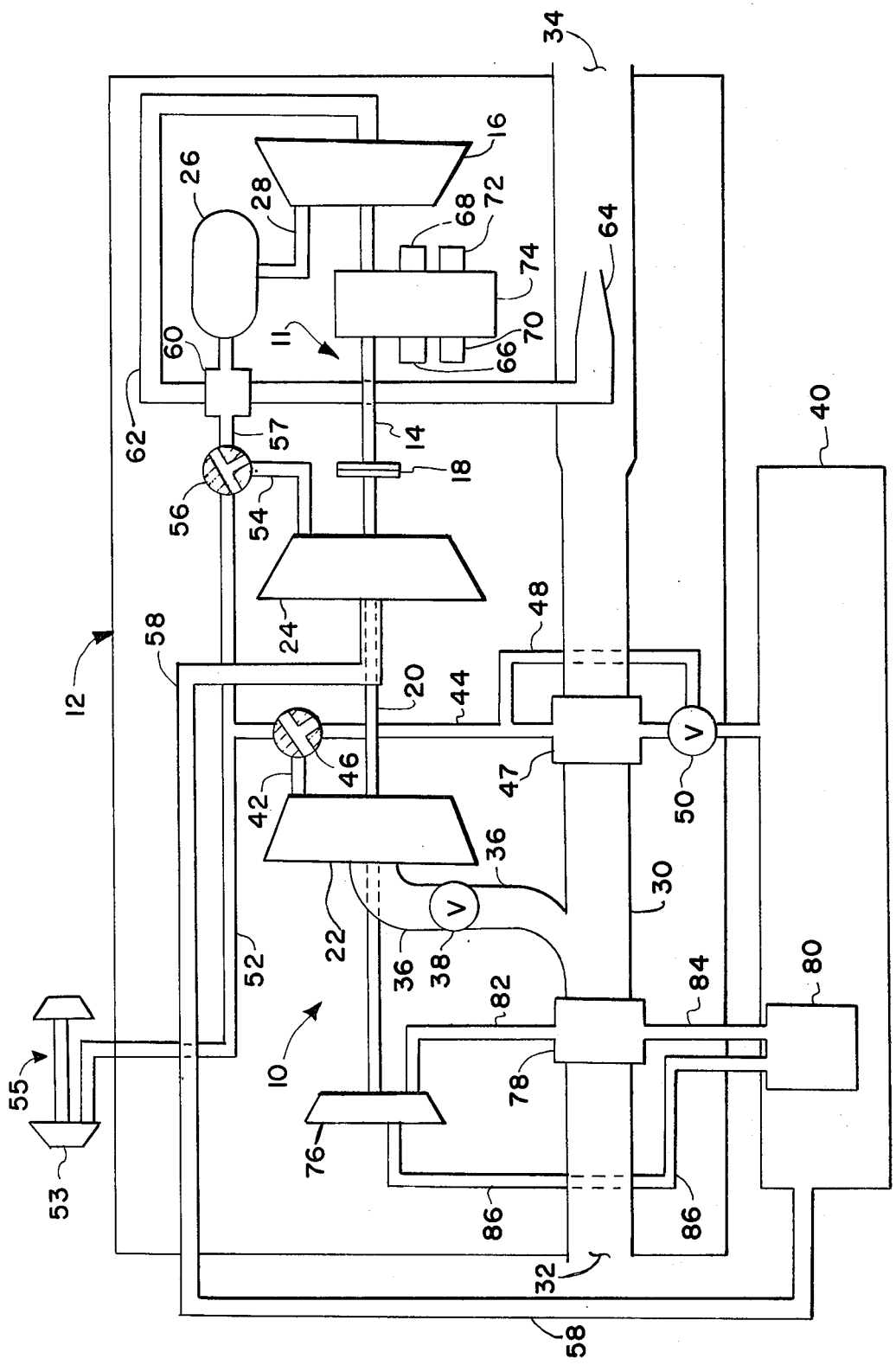

INDEPENDENT POWER GENERATOR

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

This invention relates generally to aircraft auxiliary power systems and more particularly to a gas turbine powered aircraft auxiliary power system capable of efficiently supplying all aircraft auxiliary services both in flight and on the ground and further capable of operating independently of the aircraft main engines.

DESCRIPTION OF THE PRIOR ART

At present, virtually all aircraft rely on the propulsion engines to power the aircraft's auxiliary systems when in flight. On the ground, power is typically supplied by either a ground cart or an on-board auxiliary power unit.

The disadvantages of this method are manifold. Aircraft drag is increased in the form of enlarged engine nacelles as a result of the requirements that many inflight systems must be grouped around their main engine power source. Additionally, the auxiliary power unit diminishes the payload capacity and range of the aircraft since it is dead weight in flight, and the use of main engine bleed air to power some of the auxiliary systems, in the case of fan-type turbo-jet engines, causes both a performance penalty and a marked increase in fuel consumption. Furthermore, the aircraft main engines are a far cry from an ideal power source for directly driving auxiliary systems as their shaft speed can vary by as much as 2 to 1 depending upon the flight mode. Such a speed variation must be compensated for by a constant speed drive system for AC electrical generators and by oversizing hydraulic pumps so that they can satisfy the maximum hydraulic power demand at minimum main engine speed. These compensating means extract additional performance penalties in the form of increased weight, drag and power requirements.

SUMMARY OF THE INVENTION

Accordingly, one object of the present invention is to provide an aircraft auxiliary power system which operates independently of the main engines.

Another object of the present invention is to provide a unitary aircraft auxiliary power system which provides power services when the aircraft is in flight and on the ground.

Yet another object of the present invention is to provide an aircraft auxiliary power system capable of efficient inflight operation regardless of altitude and further capable of efficient ground operation.

Still another object of the present invention is to provide an aircraft auxiliary power system with the capability of multiple mode operation in the event of partial system failure.

A still further object of the present invention is to provide an aircraft auxiliary power system which makes maximum utilization of fuel energy input.

According to one embodiment of the present invention, the foregoing and other objects are attained by providing a gas turbine engine having two or more compressor stages which may be decoupled from the turbine. The gas turbine engine is located in the approximate hydraulic and electrical load center of the airplane. The first compressor stage is provided with a variable geometry inlet duct which is connected to a generally longitudinal ram air duct running entirely through the auxiliary power system compartment and open to the atmosphere at both its forward and after end. The first compressor stage discharge air is ducted to the aircraft cabin, thereby providing cabin heat, pressurization and ventilation, and the desired cabin pressure is maintained by varying the geometry of the first compressor stage inlet duct. Adequate cabin temperature is maintained by routing the first stage discharge air through or around a heat exchanger installed in the ram air duct.

Intake air for the second compressor stage is obtained from the cabin discharge air, via suitable ducting thus the second compressor stage is supplied with relatively constant pressure intake air regardless of aircraft altitude. The second compressor stage, and any subsequent stages if fitted, compress air for the combustion process. Discharge air from the second compressor stage is ducted to the combustion chamber through an exhaust gas heat exchanger, or recuperator, which pre-heats the compressed combustion air. Fuel is added in the combustion chamber and the resulting mixture is burned to produce the gases which power the turbine. Hot exhaust gases are routed via a duct through the above described recuperator and then exhausted to the atmosphere through a downstream-facing jet pump nozzle located in the ram air duct. This exhaust system promotes air flow through the ram air duct when the aircraft is sitting on the ground and provides a measure of forward thrust.

Air conditioning is provided by a vapor cycle system having its compressor mounted directly on the main compressor shaft and having heat exchangers located in the ram air duct and the aircraft cabin. Hydraulic and electrical services are provided by hydraulic pumps and alternators mounted on a common, shaft-driven gearbox.

The auxiliary power system is further fitted with a main engine bleed air line connecting the main engine compressors with both the first and second stage auxiliary compressor discharge ducts. The main engine bleed air line is connected to the first and second stage discharge ducts by means of independently operable three way valves. This bleed line enables the auxiliary system's first compressor stage discharge air to be used to start the main engines, and additionally, provides for the use of main engine bleed air for cabin pressurization and ventilation in the event of auxiliary first stage compressor failure. Furthermore, the main engine bleed line enables the auxiliary system to be operated as a bleed-burn turbine at full rated capacity in the event of auxiliary second stage compressor failure by decoupling the auxiliary compressors from the turbine shaft and supplying main engine bleed air directly to the auxiliary combustion chamber. Yet additional safety through redundancy is available, although at reduced power, by operating the auxiliary turbine as a bleed air turbine directly from the main engine bleed air.

Various other objects and advantages of this invention will appear from the following description of the preferred embodiment when considered in connection with the accompanying drawing.

BRIEF DESCRIPTION OF THE DRAWINGS

FIG. 1 is a schematic representation of an aircraft auxiliary power system constructed according to the present invention.

DESCRIPTION OF THE PREFERRED EMBODIMENT

Referring now to FIG. 1 wherein the aircraft auxiliary power system of the present invention is shown schematically and designated generally by the reference numeral 10, it may readily been seen that auxiliary power system 10 is constructed of a number of components working cooperatively to furnish all necessary aircraft secondary services. For maximum efficiency, the system should be located as closely as possible to the hydraulic and electric load center of the aircraft. This location may be best achieved in modern commercial aircraft by locating those components suitable for compartmentalization in the wing root of the aircraft. Safety considerations require redundancy and suitable fire bulkheading, therefore dual systems located in separate compartments at each wing root should be employed.

The core of auxiliary power system 10 is a gas turbine engine, designated generally by the reference numeral 11, having a plurality of air compressor stages. Turbine engine 11 is located within an auxiliary power system compartment 12 and consists basically of a conventional single spool gas turbine engine modified to permit the turbine to be disconnected from the compressor stages. In detail, turbine engine 11 is comprised of a turbine wheel 16 fixedly mounted on turbine shaft 14 which is drivingly connected to a compressor shaft 20 by means of a clutch 18. Clutch 18 may be of any suitable conventional construction which, when disengaged, permits shaft 14 to rotate independently of shaft 20. A first stage intake air compressor 22 and a second stage intake air compressor 24 are fixedly mounted on and drivingly connected to compressor shaft 20. Turbine engine 11 is enclosed in a casing of conventional design (not shown) which also houses combustion chamber 26 and gas duct 28.

Auxiliary power system compartment 12 is provided with a ram air duct 30 extending entirely therethrough. The forward end 32 and after end 34 of duct 30 are open to the atmosphere thus permitting a relative flow of air through ram air duct 30 when the aircraft is in motion.

Intake air for the gas turbine engine is supplied via inlet duct 36 which connects ram air duct 30 with the intake side of first stage intake air compressor 22. Duct 26 is provided with a valve 38, or other suitable means (such as a constrictable Venturi), by which the cross sectional area of duct 36 may be varied in order to control the discharge pressure of first stage compressor 22, as will be hereinafter discussed.

The compressed air discharge of first stage compressor 22 provides cabin pressurization, heat and ventilation and further serves as a source of compressed starting air for the aircraft main engines. Accordingly, the first stage discharge air is conveyed to aircraft cabin 40 via ducts 42 and 44, three way valve 46, a heat exchanger 47 located in ram air duct 30, heat exchanger bypass duct 48 and control valve 50. Cabin temperature is controlled by varying the proportion of the warm (approximately 400° F) first stage discharge air passing through heat exchangers 47 and bypass duct 48 by means of control valve 50. Three way valve 46 is also fitted with a bleed air line 52 connecting the first stage discharge ducts 42 and 44 with the main engine compressors 53 and second stage compressor discharge duct 54 via three way valve 56. Bleed air line 52 serves the dual function of conveying first stage compressor discharge air to the main engines designated generally by reference numeral 55 in order to start the main engines, and conveying main engine bleed air to combustion chamber 26 and aircraft cabin 40 in the event of failure of auxiliary power system compressors 22 and 24.

Pressurized cabin 40 is provided with a cabin air discharge duct 58 which conveys pressurized cabin discharge air to the inlet side of second stage compressor 24. It, therefore, may be seen that cabin 40 is in effect a plenum chamber between the first and second compressor stages which serves as a source of constant pressure intake air for the combustion process. Thus an auxiliary power system as taught by the present invention, wherein the aircraft cabin serves as an interstage plenum, obviates the necessity of overdesigning the second stage, or combustion, compressor 24 for high altitude operation and further provides for efficiently supplied cabin pressurization, heat and ventilation.

The further compressed discharge air of second stage compressor 24 is conveyed to combustion chamber 26 via ducts 54 and 57, three way valve 56 and recuperator 60. Recuperator 60 comprises a heat exchanger located in turbine exhaust duct 62 in order to preheat the compressed combustion air with waste exhaust gas heat, thereby enhancing the thermodynamic efficiency of the combustion process. The preheated compressed combustion air is mixed with fuel and burned in combustion chamber 26 and the resultant hot combustion gases are channeled by means of duct 28 to turbine 16 whereupon the thermodynamic energy of combustion is converted to mechanical energy in the conventional manner.

Spent exhaust gases are conducted away from turbine 16 via exhaust duct 62 having recuperator 60 located therein as hereinabove explained. Exhaust duct 62 terminates a downstream facing jet pump nozzle 64 located within ram air duct 30. Hot exhaust gases exiting jet pump nozzle 64 serve to promote the flow of air through ram air duct 30 when the aircraft is stationary on the ground and when in flight, and further provide supplementary forward thrust.

Hydraulic and electric services are provided by twin alternators 66 and 68 and twin hydraulic pumps 70 and 72 mounted on and driven from a common gearbox 74. Gearbox 74 is directly driven by turbine shaft 14. Air conditioning is accomplished by providing a conventional freon vapor cycle plant having a compressor 76 mounted on and driven by compressor shaft 20 and further having a liquid-side heat exchanger 78 located within ram air duct 40 and an expansion heat exchanger 80 located within aircraft cabin 40. Tubing 82 connects compressor 76 to heat exchanger 78, tubing 84 connects heat exchanger 78 with heat exchanger 80, and tubing 86 connects heat exchanger 80 with compressor 76.

In operation, ambient air enters the forward end 32 of ram air duct 30 due to the forward motion of the aircraft and/or the negative pressure created in duct 30 by the intake action of first stage compressor 22 and the downstream discharge of exhaust gases from jet pump nozzle 64. The air then passes through air conditioning heat exchanger 78, thereby cooling the compressed refrigerant contained therein. Immediately downstream of heat exchanger 78 a portion of the incoming air enters first stage inlet duct 36. The balance of the incoming air continues downstream with ram air duct 30, first passing through heat exchanger 47 where it cools the compressed air discharge of first stage compressor 22 and secondly passing by jet pump nozzle 64 where the moving air is accelerated by entrainment in the downstream flow of hot exhaust gases exiting nozzle 64 and lastly being expelled from the after, or downstream, terminus 34 of ram air duct 30.

That portion of the incoming air which enters inlet duct 36 is compressed by first stage compressor 22 and routed to aircraft cabin 40 via ducts 42 and 44, three way valve 46, heat exchangers 47, bypass duct 48, and control valve 50. The compressed air discharge of first stage compressor provides cabin pressurization, ventilization and heating for cabin 40. The degree of cabin heating is controlled by varying, by means of control valve 50, the proportion of first stage compressed air discharge which passes through heat exchanger 47 and bypass duct 48. Cabin pressurization is controlled by varying the geometry of inlet duct 36 by means of valve 38. First stage discharge air may also be used to start the aircraft main engines by positioning three way valves 46 and 56 such that the first stage discharge air is routed into bleed air line 52, which connects first and second stage auxiliary power system compressor discharge ducts, 42 and 54 respectfully, with the main engine compressors.

Cooling of aircraft cabin 40 is accomplished by means of air conditioning heat exchanger 80 located therein. Pressurized cabin air is exhausted via cabin discharge duct 58 to the intake side of second stage compressor 24 where it is further compressed and routed to combustion chamber 26 via duct 54, three way valve 56 and recuperator 60. Recuperator 60 is mounted within exhaust duct 62 and serves to utilize a portion of the exhaust gas waste heat to preheat the compressed combustion air. Fuel is mixed with the preheated compressed combustion air in combustion chamber 26, and the mixture is burned. Hot combustion gases are routed to turbine 16 via duct 28 and thence pass into exhaust duct 62 from which the gases are exhausted to the atmosphere via jet pump nozzle 64. Jet pump nozzle 64 serves to promote the flow of air through ram air duct 30 and further provides a measure of forward thrust. As hereinabove stated, hydraulic and electrical services are provided by gearbox driven alternators 66 and 68 and hydraulic pumps 70 and 72.

In the event of compressor or combustion chamber/fuel failure, an aircraft auxiliary power system constructed according to the present invention may be operated in one of two emergency modes. If one or both intake air compressors fail, the system may be operated at full rated power as a bleed-burn turbine by positioning three way valves 46 and 56 such that main engine bleed air is supplied to aircraft cabin 40 via duct 44 and combustion chamber 26 via duct 57. If necessary, compressor shaft 20 may be decoupled from turbine shaft 14 by means of clutch 18. In the bleed-burn configuration, therefore, it may be seen that the normal combustion process is accomplished with main engine bleed air.

In the event of combustion chamber and/or fuel failure, the system may be operated at reduced capacity as a bleed-air turbine. In the bleed-air configuration, valves 46 and 56 are positioned as they would be in the bleed burn mode described above and turbine wheel 16 is operated solely by main engine bleed air. Again clutch 18 may be disengaged if necessary.

It should be noted that the present invention may be practiced otherwise than as specifically set forth above. For example, first stage compressor 22 need not be an integral compressor stage in gas turbine engine 11, but may instead be separate compressor, preferably shaft driven, external to gas turbine engine 11.

A device constructed according to the present disclosure, therefore, has the capabilities of independently and efficiently supplying all aircraft secondary services from a lightweight, compact and constant speed system which need not be overdesigned to perform satisfactorily under adverse conditions. Further, a device constructed according to the present invention incorporates multiple safety features providing for emergency operation in the event of partial system failure. Obviously, numerous modifications of the present invention are possible in light of the above teachings. It is therefore to be understood that within the scope of the appended claims the invention may be practical otherwise than as specifically described herein.

What is claimed as new and desired to be secured by Letters Patent of the United States is:

1. An aircraft auxiliary power system comprising
a gas turbine engine having a combustion chamber,
a pressurizable aircraft cabin,
a plurality of intake air compressor means,
wherein the first of said intake air compressor means discharges to said pressurizable aircraft cabin and the second intake air compressor means receives intake air from said pressurizable aircraft cabin, and
a ram air duct having an inlet and outlet open to the ambient atmosphere, and connected to said first intake air compressor means in order to convey air thereto;
a gas turbine exhaust duct for conveying exhaust gases from said gas turbine engine to the atmosphere having an exhaust gas exit nozzle located within said ram air duct and facing downstream with respect to the air flow through said ram air duct.

2. An aircraft auxiliary power system as in claim 1 further comprising compressor inlet air duct means for conveying ambient air to the intake of the first of said plurality of intake air compressor means:
cabin inlet duct means for conveying the compressed air discharge of the first of said plurality of intake air compressor means to said pressurizable aircraft cabin;
cabin exhaust duct means for conveying pressurized cabin discharge air to the intake of the second of said plurality of intake air compressor means;
combustion chamber inlet duct means for conveying the compressed air discharge of the last of said plurality of air compressor means to the combustion chamber of said gas turbine engine.

3. An aircraft auxiliary power system comprising:
a gas turbine engine having a combustion chamber;
a pressurizable aircraft cabin;
a plurality of intake air compressor means for providing compressed cabin ventilation air to said pressurizable aircraft cabin and compressed intake air to said gas turbine engine;
compressor inlet air duct means for conveying ambient air to the intake of the first of said plurality of intake air compressor means;
cabin inlet duct means for conveying the compressed air discharge of the first of said plurality of intake air compressor means to said pressurizable aircraft cabin;

cabin exhaust duct means for conveying pressurized cabin discharge air to the intake of the second of said plurality of intake air compressor means;

combustion chamber inlet duct means for conveying the compressed air discharge of the last of said plurality of air compressor means to the combustion chamber of said gas turbine engine;

a ram air duct having an inlet and outlet open to the ambient atmosphere, and connected to said compressor inlet air duct means in order to convey air thereto;

a gas turbine exhaust duct for conveying exhaust gases from said gas turbine engine to the atmosphere having an exhaust gas exit nozzle located within said ram air duct and facing downstream with respect to the air flow through said ram air duct;

means for generating electrical power;

means for providing hydraulic fluid under pressure; and drive means drivingly connecting said means for generating electrical power and said means for providing hydraulic fluid under pressure to said gas turbine engine.

4. An aircraft auxiliary power system as in claim 2 further comprising;

a ram air duct having an inlet and outlet open to the ambient atmosphere, and connected to said compressor inlet air duct means in order to convey air thereto.

5. An aircraft auxiliary power system as in claim 3 further comprising an air conditioning system including an air conditioning compressor drivingly connected to said gas turbine engine.

6. An aircraft auxiliary power system as in claim 3 further comprising:

gas turbine means for providing aircraft main propulsion, and main engine bleed air means for conveying a portion of the compressed air discharge of a portion of the plurality of intake air compressor means to the compressor stages of said main propulsion gas turbine means for supplying compressed starting air to said main propulsion gas turbine means and further, subsequent to starting main propulsion means for conveying compressed main engine bleed air from the compressor stages of said main propulsion gas turbine means to the combustion chamber of said gas turbine engine and to said cabin inlet duct means for purpose of ventilation.

7. An aircraft auxiliary power system as in claim 6 wherein said main engine bleed air means further comprises valve means for isolating said main engine bleed air means from said cabin inlet duct means and said combustion inlet duct means.

8. An aircraft auxiliary power system as in claim 3 wherein said cabin inlet duct means further comprises a cabin pressurization heat exchanger exposed to the ambient airstream, a bypass duct around said cabin pressurization heat exchanger, and a control valve for purposes of regulating the temperature of the compressed air discharge of the first of said plurality of intake air compressor means.

9. An aircraft auxiliary power system as in claim 3 wherein said plurality of intake air compressor means consists of two shaft mounted axial flow air compressors.

10. An aircraft auxiliary power system as in claim 3 wherein said compressor inlet air duct means further comprises means for varying the inlet geometry thereof for purposes of regulating the discharge air pressure of the first of said plurality of intake air compressor means.

11. An aircraft auxiliary power system as in claim 4 wherein said combustion chamber inlet duct means further comprises;

a heat exchanger located within said gas turbine exhaust duct.

12. An aircraft auxiliary power system as in claim 5 wherein said air conditioning system comprises a freon cycle air conditioning unit having a refrigerant compressor drivingly connected to the shaft of said gas turbine engine, a compressed refrigerant heat exchanger exposed to the ambient airstream and a refrigerant expansion heat exchanger located within said pressurizable aircraft cabin.

13. An aircraft auxiliary power system as in claim 7 further comprising:

a freon cycle air conditioning system having a refrigerant compressor drivingly connected to the shaft of said gas turbine engine, a compressed refrigerant heat exchanger exposed to the ambient airstream and a refrigerant expansion heat exchanger located within said pressurizable aircraft cabin; and wherein said cabin inlet duct means further comprises a cabin pressurization heat exchanger exposed to the ambient airstream, a bypass duct around said cabin pressurization heat exchanger and a control valve for purposes of regulating the temperature of the compressed air contained within said cabin inlet duct means;

said plurality of intake air compressor means comprises a first and a second stage axial flow air compressor drivingly connected to the shaft of said turbine engine;

said compressor inlet air duct means includes a valve means for varying the inlet geometry thereof for purposes of regulating the discharge air pressure of said first stage air compressor; and said combustion chamber inlet duct means further comprises a heat exchanger located within said gas turbine exhaust duct.

14. An aircraft auxiliary power system as in claim 13 further comprising clutch means for disconnecting said plurality of intake air compressor means from the turbine of said gas turbine engine.

* * * * *